United States Patent
Colligan (10) Patent No.: US 8,526,259 B2
(45) Date of Patent: *Sep. 3, 2013

(54) DISK DRIVE WITH STATE-INFORMATION DATA BUFFER

(75) Inventor: Thomas R. Colligan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,936

(22) Filed: Apr. 23, 2012

(65) Prior Publication Data

US 2012/0210051 A1 Aug. 16, 2012

Related U.S. Application Data

(63) Continuation of application No. 12/700,419, filed on Feb. 4, 2010, now Pat. No. 8,189,283.

(51) Int. Cl.
*G11C 7/04* (2006.01)
*G11B 19/02* (2006.01)

(52) U.S. Cl.
USPC ........... 365/211; 365/212; 360/69; 360/97.02

(58) Field of Classification Search
USPC ..................... 365/211, 212, 185.02
See application file for complete search history.

(56) References Cited

U.S. PATENT DOCUMENTS

| 6,661,724 | B1* | 12/2003 | Snyder et al. ................. 365/211 |
| 7,430,093 | B2* | 9/2008 | Lee et al. .................... 360/78.06 |
| 7,920,352 | B2 | 4/2011 | Inoue et al. |
| 8,189,283 | B2* | 5/2012 | Colligan ......................... 360/69 |
| 2001/0036027 | A1 | 11/2001 | Min et al. |
| 2002/0159354 | A1 | 10/2002 | Nakabayashi |
| 2008/0037164 | A1 | 2/2008 | Oh et al. |
| 2012/0134213 | A1* | 5/2012 | Choi et al. ............... 365/185.18 |

* cited by examiner

*Primary Examiner* — Tan T. Nguyen
(74) *Attorney, Agent, or Firm* — Womble Carlyle Sandridge & Rice LLP (57) ABSTRACT

A hard-disk drive (HDD) is described. During operation of the HDD, measured internal temperatures in the HDD may be stored in a first table, and state information specifying operational states of the HDD associated with ranges of internal temperatures may be stored in a second table. Note that a given operational state in the second table may be associated with a corresponding internal temperature in the first table. Furthermore, during operation of the HDD, the first table and/or the second table may be stored on: a rotatable medium in the HDD, a semiconductor memory in the HDD, or both. This stored table information may facilitate error detection and diagnosis.

31 Claims, 5 Drawing Sheets

FIG. 1

| TABLE 210 |
|---|
| SAMPLING PERIOD 220 |
| INTERVAL SETTING 222 |
| INTERNAL TEMPERATURE 212-1 |
| INTERNAL TEMPERATURE 212-2 |
| INTERNAL TEMPERATURE 212-3 |
| ... |

| TABLE 214 |
|---|
| OPERATIONAL STATE 216-1 |
| OPERATIONAL STATE 216-1 |
| OPERATIONAL STATE 216-1 |
| OPERATIONAL STATE 216-1 |
| OPERATIONAL STATE 216-2 |
| ... |

DISK DRIVE WITH STATE-INFORMATION DATA BUFFER

RELATED CASES

This application is a continuation application of, and hereby claims priority under 35 U.S.C. §120 to, U.S. patent application Ser. No. 12/700,419, by inventor Thomas R. Colligan, which is titled "Disk Drive with State-Information Buffer," and which was filed on 4 Feb. 2010, now U.S. Pat. No. 8,189,283.

BACKGROUND

1. Field

The present disclosure relates to hard-disk drives (HDD). More specifically, the present disclosure relates to an HDD that includes a table of state information that specifies operational states of the HDD.

2. Related Art

During operation, a hard-disk drive (HDD) can generate a significant amount of thermal energy. If this thermal energy is not properly removed, the excessive thermal energy can result in overheating of the HDD.

To mitigate this problem, a closed-loop control system can be used to manage the temperature of the HDD. For example, embedded temperature sensors in the HDD can measure the internal temperature during operation of the HDD. Then, the measured internal temperatures can be communicated to a system-level thermal management controller via an interface, for example: via a serial ATA (SATA) interface, a Small Computer System Interface (SCSI) or a Serial Attached SCSI (SAS). Based on the internal temperature measurements, this system-level thermal management controller can adjust the amount of heat that is removed from the HDD by one or more convective or conductive heat-transfer devices (such as a fan, a heat pipe, a heat sink, etc.).

However, communicating the measured internal temperatures via the interface can compete with normal data transfers and may involve custom drivers for a given HDD. Consequently, engineers have recently proposed converting the measured internal temperatures into state information that indicates the operational state of the HDD. This state information can be communicated to the external system via a separate interface, which is sometimes referred to as 'out-of-band' (OOB) communication.

While this OOB communication technique can address some of the problems associated with communicating the measured internal temperatures via the interface, additional problems may be introduced. For example, errors can occur when the measured internal temperatures are converted into the state information and/or during the OOB communication through the separate interface. Because the external system usually only has access to the received state information, it can be difficult to diagnose and correct errors during the conversion process and/or the OOB communication. For example, it can be difficult to correlate the actual measured internal temperature with the state information reported via the separate interface.

Hence, what is needed is an HDD that overcomes the problems listed above.

SUMMARY

One embodiment of the present disclosure relates to a hard-disk drive (HDD) that includes one or more transducers that selectively write data to or read data from a rotatable medium during operation of the HDD, where the rotatable medium magnetically coupled to the one or more transducers during the operation of the HDD. Furthermore, the HDD includes control logic that stores table information associated with a first table and a second table on the rotatable medium using the one or more transducers during operation of the HDD. (Alternatively, as described further below, the first table and the second table can be stored in a non-volatile semiconductor memory.) Note that the table information in the first table includes internal temperatures measured during operation of the HDD, and the table information in the second table includes state information specifying operational states of the HDD associated with ranges of internal temperatures. More specifically, a given operational state in the second table can be associated with a corresponding internal temperature in the first table.

Note that there may be a many-to-one relationship between the internal temperatures and the operational states. Also, there may be the same number of entries in the first table and the second table.

In some embodiments, the HDD includes a first interface circuit that receives the write data from, and provides the read data to, an external device via a first link. Furthermore, the HDD may include a second interface circuit that provides the operational states to the external device via a second link. This second link may be distinct from the first link Additionally, the operational states in the second table may facilitate checking of the accuracy of the operational states received at the external device via the second link.

Moreover, the internal temperatures and the operational states may facilitate checking whether the operational states were determined properly.

Note that the given operational state can include: a normal operating state; a degraded operating state in which functionality and reliability of the HDD are compromised; a severely degraded state in which data integrity within the HDD is compromised; and/or a thermal emergency state in which the HDD is at risk of failure.

Another embodiment provides another or the same HDD that includes a semiconductor memory. Furthermore, the control logic may store the table information associated with the first table and the second table on the semiconductor memory during operation of the other HDD.

Another embodiment provides a computer system that includes the HDD and/or the other HDD.

Another embodiment provides a method of operating an HDD. During operation of the HDD, the HDD measures internal temperatures in the HDD. Then, the HDD stores the table information associated with the first table and the second table on the semiconductor memory and/or on the rotatable medium using the one or more transducers.

BRIEF DESCRIPTION OF THE FIGURES

Table 1 provides an example of the state information stored in the second table in the HDD of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a hard-disk drive (HDD), a computer system that includes the HDD, and a method of operating the HDD are described. During operation of the HDD, measured internal temperatures in the HDD may be stored in a first table, and state information specifying operational states of the HDD associated with ranges of internal temperatures may be stored in a second table. Note that a given operational state in the second table may be associated with a corresponding internal temperature in the first table. Furthermore, during operation of the HDD, the first table and/or the second table may be stored on: a rotatable medium in the HDD, a semiconductor memory in the HDD, or both.

By storing the first table and the second table, the HDD may solve the problem of diagnosing and correcting errors during the conversion of the measured internal temperatures to the state information and/or the communication of the state information to the computer system. In particular, errors can be readily identified (without using an analyzer or a digital oscilloscope) and, if needed, corrective action can be taken. For example, the table information in the first table and the second table can be compared, or the state information in the second table can be compared with the state information received by the computer system.

Figure 1:
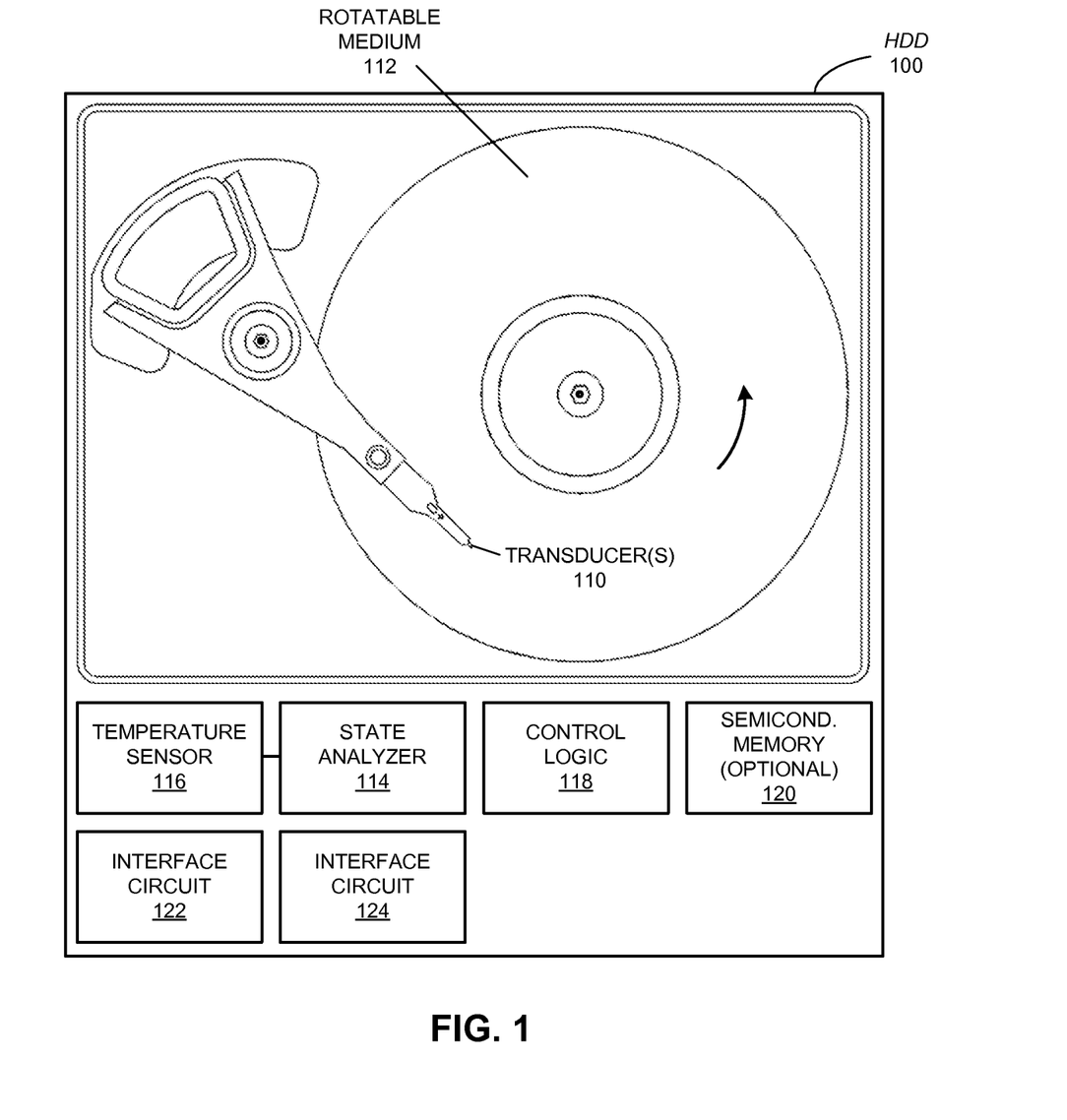
FIG. 1 is a block diagram of a hard-disk drive (HDD) in accordance with an embodiment of the present disclosure.

We now describe embodiments of the HDD. FIG. 1 presents a block diagram of HDD 100. This HDD includes: one or more transducers 110 that selectively write data to or read data from a rotatable medium 112 during operation of HDD 100. Furthermore, to facilitate thermal management of HDD 100 by an external device or system (such as computer system 400 in FIG. 4), HDD 100 may include platform-independent mechanisms for accurately assessing state information (such as operational states or thermal states of HDD 100). In particular, the state information may be provided by a state analyzer 114. This state analyzer may assess the state of HDD 100 using internal temperatures measured using temperature sensor 116, as well as information associated with the design and/or thermal tolerance of HDD 100. Consequently, state analyzer 114 may include functionality to characterize the state of HDD 100 beyond the absolute internal temperature measurements in HDD 100.

HDD 100 may also include control logic 118 that stores table information associated with a first table and a second table on: rotatable medium 112 using the one or more transducers 110 during operation of HDD 100 and/or that store the table information associated with the first table and the second table on optional semiconductor memory 120 during operation of HDD 100. As described further below with reference to FIG. 2, this table information in the first table may include internal temperatures measured by temperature sensor(s) 116 during operation of the HDD, and the table information in the second table may include the state information specifying the operational states of HDD 100 associated with ranges of internal temperatures that are provided by state analyzer 114.

As described further below with reference to FIG. 4, in some embodiments HDD 100 includes an interface circuit 122 that receives the write data from and provides the read data to the external device via a first link. For example, interface circuit 122 may include: a serial ATA (SATA) interface, a Small Computer System Interface (SCSI) or a Serial Attached SCSI (SAS).

Furthermore, HDD 100 may include an interface circuit 124 that provides the operational states to the external device via a second link. This second link may be distinct from the first link, and may facilitate out-of-band (OOB) communication between HDD 100 and the external device. For example, the second link may be a unidirectional, low-speed serial link (with a data rate of less than 100 kb/s), such as an inter-integrated circuit ($I^2C$) system bus or RS-232. Note that a given frame of RS-232 formatted data may contain: a start bit, eight data bits, and a stop bit. This stop bit may result in a mandatory period of line inactivity after the transmission of the given frame.

In addition to facilitating thermal management of HDD 100, the stored table information may be used for diagnostic purposes, such as checking the accuracy of: the conversion of the measured internal temperatures into the operational states by state analyzer 114 and/or the operational states received at the external device via the second link. For example, an application executing on the external device can request/obtain the table information in the first table and the second table. This table information, as well as the operation states received via the second link, can be displayed on a display or user interface on the external device for purposes of comparison and to allow errors to be diagnosed. Furthermore, the table information can be used to trap errors. Thus, if an invalid byte is received via the second link, the application can be set to 'stop on error.'

In some embodiments, interface circuit 124 and the second link are used to provide information regarding the state of HDD 100 between transmissions of the frames of data. For example, the line voltage of the signal over the second link may be held high between transmissions of the frames of data during operation of HDD 100. On the other hand, the line voltage of the signal may be held low if HDD 100 is asleep and/or unavailable. As a consequence, the voltage over the second link may be used to distinguish among different states of HDD 100: a high voltage may represent an operating state, a low voltage may represent a sleep state, and no voltage (e.g., no signal) may indicate that HDD 100 is disconnected or not installed.

Figure 2:
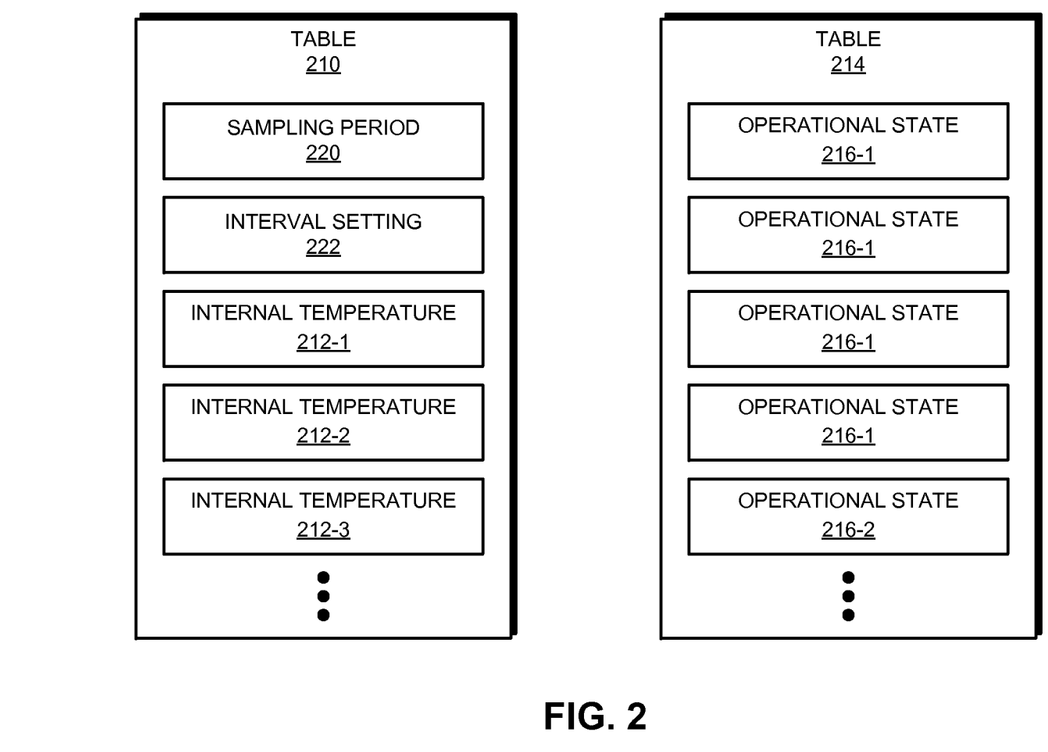
FIG. 2 is a block diagram of tables that are stored during operation of the HDD of FIG. 1 in accordance with an embodiment of the present disclosure.

FIG. 2 presents a block diagram of tables 210 and 214 that are stored during operation of HDD 100 (FIG. 1). Table 210 (i.e., the first table) may include internal temperatures 212 measured during operation of HDD 100 (FIG. 1), and table 214 (i.e., the second table) may include state information specifying operational states 216 of HDD 100 (FIG. 1) associated with ranges of internal temperatures. In addition, a given operational state in table 214 is associated with a corresponding internal temperature in table 210. Therefore, there may be a many-to-one relationship between internal temperatures 212 and operational states 216. However, there may be the same number of entries in the table 210 and table 214.

In an exemplary embodiment, tables 210 and 214 include between 128 and 478 byte entries. Note that the time for each buffer entry can be set using sampling period 220 and interval setting 222. For example, sampling period 220 and interval setting 222 can each be set to one minute, in which case tables 210 and 214 (FIG. 2) may each include between 128-478 minutes of thermal history data.

Table 1 provides an example of the state information stored in the second table in the HDD 100 (FIG. 1). Bits 0-2 in a given operational state in table 214 (FIG. 2) may encode the internal temperature as an temperature offset within a given range of temperatures (see below). In particular, the given operational state may encode a temperature offset from a thermal boundary in a given range of internal temperatures. For example, the temperature offset may correspond to a number of degrees C. below a thermal state boundary. Therefore, as the internal temperature increases in the given range of internal temperatures, the temperature offset may decrease. Note that a temperature offset of '0' may indicate that HDD 100 (FIG. 1) is at a thermal state boundary, such that any further increase in the internal temperature will take HDD 100 (FIG. 1) into another range of internal temperatures. In addition, temperature offsets greater or equal to 7 C below the top thermal state boundary of the current range of internal temperatures may be reported as a '7' (e.g., '111').

TABLE 1

| Bit(s) | Values | Comment |
| --- | --- | --- |
| 0-2 | 000-111 | Temperature offset |
| 3, 4 | 00 | Normal operating range |
| 3, 4 | 10 | Degraded operating range |
| 3, 4 | 01 | Severely degraded operating range |
| 3, 4 | 11 | Thermal emergency range |
| 5, 6 | 00 | One byte message |
| 5, 6 | 01-11 | Other types of messages |
| 7 | 0 | Specifies baud rate or stop |

Furthermore, bits 3 and 4 in a given operational state in table 214 may specify the range of internal temperatures. In particular, the ranges of internal temperatures may include: a normal operating state (bit 3 equal to '0' and bit 4 equal to '0'); a degraded operating state in which the functionality and reliability of HDD 100 (FIG. 1) are compromised (bit 3 equal to '1' and bit 4 equal to '0'); a severely degraded state in which data integrity within HDD 100 (FIG. 1) is compromised (bit 3 equal to '0' and bit 4 equal to '1'); and a thermal emergency state in which HDD 100 (FIG. 1) is at risk of failure (bit 3 equal to '1' and bit 4 equal to '1').

In addition, bits 5 and 6 may be used to convey a message type or code. For example, bit 5 equal to '0' and bit 6 equal to '0' may indicate a one byte message or frame of data, while other encodings may be used for messages of other types and/or lengths (e.g., 5-7 bits). Bit 7 may store a fixed value (e.g., '0') at the end of every message transmitted using bits 0-7. In some embodiments, bit 7 is used to determine a data rate associated with interface circuit 124 (FIG. 1). In particular, during transmission of a given message, the interval between the start of bit 0 and the end of bit 7 may be used to calculate a baud rate associated with the transmission of these bits via interface circuit 124 (FIG. 1). For example, the baud rate of interface circuit 124 (FIG. 1) may be 100 baud if the interval between the start of bit 0 and the end of bit 7 is 90 ms. On the other hand, interface circuit 124 (FIG. 1) may transmit bits 0-7 at 200 baud if the interval between the start of bit 0 and the end of bit 7 is 45 ms.

The calculated baud rate may then be used to identify the individual bits within the frame of data from signals received over the second link. The transmission time of each bit and the identification of a suitable bit sampling time may be determined by the use of integer division of the frame duration by the number of transmitted bits in conjunction with a continuously updated integer error term. The use of bit 7 to identify the boundaries of the frame, the positions of bits 0-7 within the frame, and/or an error term may enable the transmission of different frames of data (e.g., from multiple HDDs) at different baud rates without: handshaking, fine-grained measurement techniques, high-precision time sources, and/or other specialized hardware.

Note that during regular operation of HDD 100 (FIG. 1), updating of tables 210 and 214 and frame transmission via interface circuit 124 (FIG. 1) may occur regularly (such as every minute). This may not be the case during power saving or sleep modes. Consequently, frame transmissions may end at any time, and HDD 100 (FIG. 1) may not complete transmission of a given frame or message before entering a sleep state. Note that when this occurs there may be an optional sleep mode entry (not shown) in tables 210 and 214 (FIG. 2).

Those skilled in the art will appreciate that state information may be allocated among bits 0-7 and/or other bits in various ways. For example, additional bits may be used to encode the thermal state boundary and/or temperature offset if HDD 100 (FIG. 1) has wide operating ranges and/or is to be characterized at a higher granularity. Similarly, multiple frames of data may be used to transmit the state information if more than eight bits are required to encode the thermal state of HDD 100 (FIG. 1). In some embodiments. The number of bits in a frame is larger than 8. Alternatively or additionally, in some embodiments multiple 8-bit frames are used to communicate the state information.

Figure 3:
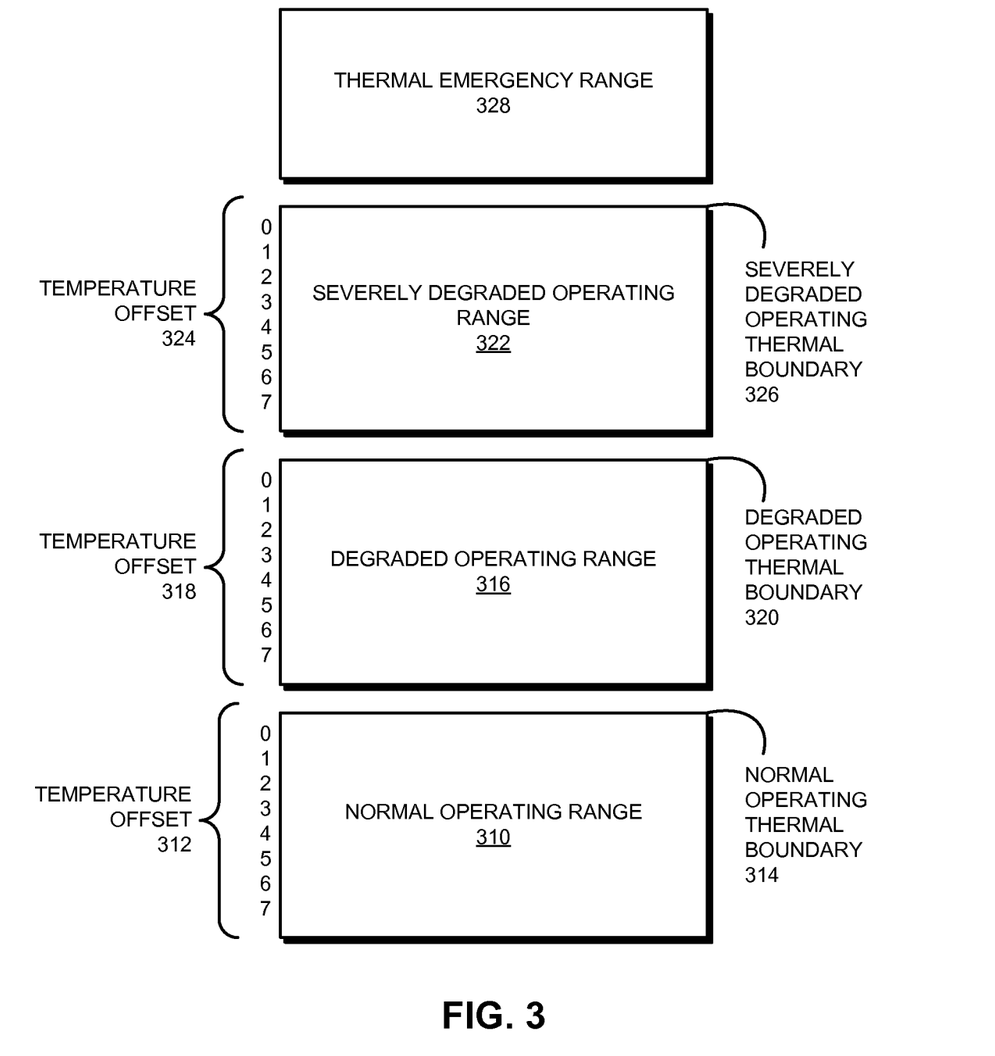
FIG. 3 is a drawing illustrating operational states for the HDD of FIG. 1 in accordance with an embodiment of the present disclosure.

FIG. 3 presents a drawing illustrating operational states for HDD 100 (FIG. 1), including temperature ranges 310, 316, 322 and 328 (which are separated by thermal boundaries 314, 320 and 326) and temperature offsets 312, 318 and 324. As discussed previously, temperature ranges 310, 316, 322 and 328 and thermal boundaries 314, 320 and 326 may be used to characterize the operational state of HDD 100 (FIG. 1) (and, in particular, the thermal state of HDD 100 in FIG. 1). In particular, the temperature ranges may include: a normal operating range 310, a degraded operating range 316, a severely degraded operating range 322, and a thermal emergency range 328. Likewise, the thermal boundaries may include: a normal operating thermal boundary 314, a degraded operating thermal boundary 320, and a severely degraded operating thermal boundary 326.

Normal operating range 310 may correspond to a range of temperatures that represent normal, undegraded operation of HDD 100 (FIG. 1). For example, the temperature of HDD 100 (FIG. 1) may be in normal operating range 310 if HDD 100 (FIG. 1) is idle and/or operating at low intensity. The top end of normal operating range 310 may be denoted by normal operating thermal boundary 314. Furthermore, if the temperature of HDD 100 (FIG. 1) is within normal operating range 310, the thermal state of HDD 100 (FIG. 1) may be reported as a temperature offset 312 of 0 to 7 degrees below normal operating thermal boundary 314 (e.g., using a set of temperature offset bits).

Degraded operating range 316 may correspond to a range of temperatures that represent a decrease in the functionality and reliability of HDD 100 (FIG. 1). For example, HDD 100 (FIG. 1) may enter degraded operating range 316 if use of HDD 100 (FIG. 1) is heavier than usual. The top end of degraded operating range 316 may be denoted by degraded operating thermal boundary 320. As with normal operating range 310, the thermal state of HDD 100 (FIG. 1) may be provided as a temperature offset 318 of 0 to 7 degrees below degraded operating thermal boundary 320 if the temperature of HDD 100 (FIG. 1) is in degraded operating range 316.

Severely degraded operating range 322 may correspond to temperatures that indicate a significant loss of integrity in HDD 100 (FIG. 1). For example, severely degraded operating range 322 may be encountered if HDD 100 (FIG. 1) is being cooled improperly and/or used heavily for an extended period of time. Severely degraded operating thermal boundary 326 may signify the top end of severely degraded operating range 322, and the thermal state of HDD 100 (FIG. 1) may be provided as a temperature offset 324 of 0 to 7 degrees below severely degraded operating thermal boundary 326 if the temperature of HDD 100 (FIG. 1) is in severely degraded operating range 322.

Finally, thermal emergency range 328 may correspond to a thermal emergency state, in which HDD 100 (FIG. 1) reaches temperatures that represent imminent failure. For example, temperatures in thermal emergency range 328 may indicate that HDD 100 (FIG. 1) is in danger of physically malfunctioning and/or shutting down. In other words, HDD 100 (FIG. 1) may require immediate cooling and/or suspension of use to prevent failure and/or fire if the thermal state of HDD 100 (FIG. 1) is reported to be in thermal emergency range 328. Because all temperature offsets within thermal emergency range 328 may be equally bad, temperatures in thermal emergency range 328 may not be provided as offsets.

As mentioned previously, the thermal state of HDD 100 (FIG. 1) may be characterized in multiple ways. For example, HDD 100 (FIG. 1) may be associated with only two temperature ranges: an acceptable range and an unacceptable range. The acceptable range may represent normal operation of HDD 100 (FIG. 1), while the unacceptable range may represent degraded operation of HDD 100 (FIG. 1). Thus, HDD 100 (FIG. 1) may require additional cooling if the temperature of HDD 100 (FIG. 1) enters the unacceptable range. Alternatively, HDD 100 (FIG. 1) may be associated with more than four temperature ranges for finer-grained characterization of the thermal state of HDD 100 (FIG. 1).

Furthermore, temperature ranges and thermal state boundaries of HDD 100 (FIG. 1) may be based on the design of HDD 100 (FIG. 1). For example, the thermal tolerance may be based on the manufacturer and/or model of HDD. An HDD with a higher thermal tolerance may include temperature ranges and thermal boundaries that skew higher than an HDD with a lower thermal tolerance. Consequently, thermal state information that is based on temperature ranges and thermal boundaries of the HDD may allow the HDD's thermal state to be assessed more accurately than an absolute internal temperature measurement of the HDD.

We now describe embodiments of the computer system. FIG. 4 presents a block diagram of a computer system 400 that includes HDD 100. This computer system includes: one or more processors 410, a communication interface 412 (corresponding to interface circuit 122 in FIG. 1), a communication interface 408 (corresponding to interface circuit 124 in FIG. 1), a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, F-RAM, MRAM, BBRAM, flash memory, one or more smart cards, one or more magnetic disc storage devices, magnetic tape, one or more optical storage devices, and/or other media capable of storing code and/or data now known or later developed. Memory 424 may store an operating system 426 that includes procedures (or a set of instructions) for handling various basic system services for performing hardware-dependent tasks. While not explicitly indicated in the computer system 400, in some embodiments the operating system 426 includes a web browser, such as: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.). Additionally, memory 424 may store procedures (or a set of instructions) in a communication module 428. These communication procedures may be used for communicating with HDD 100, as well as one or more computers and/or servers (including computers and/or servers that are remotely located with respect to the computer system 400). For example, via communication interface 412 and link 406-1, communication module 428 may provide the write data to and receive the read data from HDD 100. Similarly, via communication interface 408 and link 406-2, communication module 428 may receive one or more operational states from HDD 100.

Memory 424 may also include multiple program modules (or set of instructions), including: system-management controller 430 (or a set of instructions) and error-monitoring application 432 (or a set of instructions). Note that one or more of these program modules (or sets of instructions) may constitute a computer-program mechanism.

During operation of computer system 400, state information 434 (including operational states 436) may be received from HDD 100 via communication interface 408 and link 406-2. System-management controller 430 may manage the internal temperature of HDD 100 based on one or more operational states 436 and/or the rate of change of the temperature offset by adjusting one or more convective or conductive heat-transfer devices 404, such as a fan, a heat pipe, a heat sink, etc.

In addition, error-monitoring application 432 may diagnose errors, such as checking the accuracy of the conversion of the measured internal temperatures into operational states 436 in HDD 100 by comparing operational states 436 received via communication interface 408 and link 406-2 with table information 440 in table 438 (which may be received from HDD 100 via communication interface 412 and link 406-1 in response to a request from error-monitoring application 432). Similarly, error-monitoring application 432 may check the accuracy of operational states 436 received via communication interface 408 and link 406-2 with table information 444 in table 442 (which may be received from HDD 100 via communication interface 412 and link 406-1 in response to a request from error-monitoring application 432). In some embodiments, operational states 436, table information 440 and/or table information 444 may be displayed by error-monitoring application 432 on display 416 for purposes of comparison and to allow errors to be diagnosed (for example, by a user of computer system 400). Furthermore, error-monitoring application 432 may identify and trap errors by comparing operational states 436, table information 440 and/or table information 444.

In some embodiments, system-management controller 430 and/or error-monitoring application 432 monitor and control other physical properties of HDD 100 in addition to the thermal state via operational states 436. For example, operational states 436 may include: pressure (such as an altitude sensor output), humidity, motion, acceleration (such as shock or a free-fall sensor output), vibration, light intensity, and/or other physical attributes of HDD 100 within a mechanical, electrical, and/or other engineering system. Furthermore, the use of offsets and state boundaries to describe each physical property with respect to HDD 100 may allow system-management controller 430 to manage the physical property independently of design variations in HDD 100. Thus, tables 438 and 442 may, respectively, include information other than measured internal temperatures and thermal states.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Figure 4:
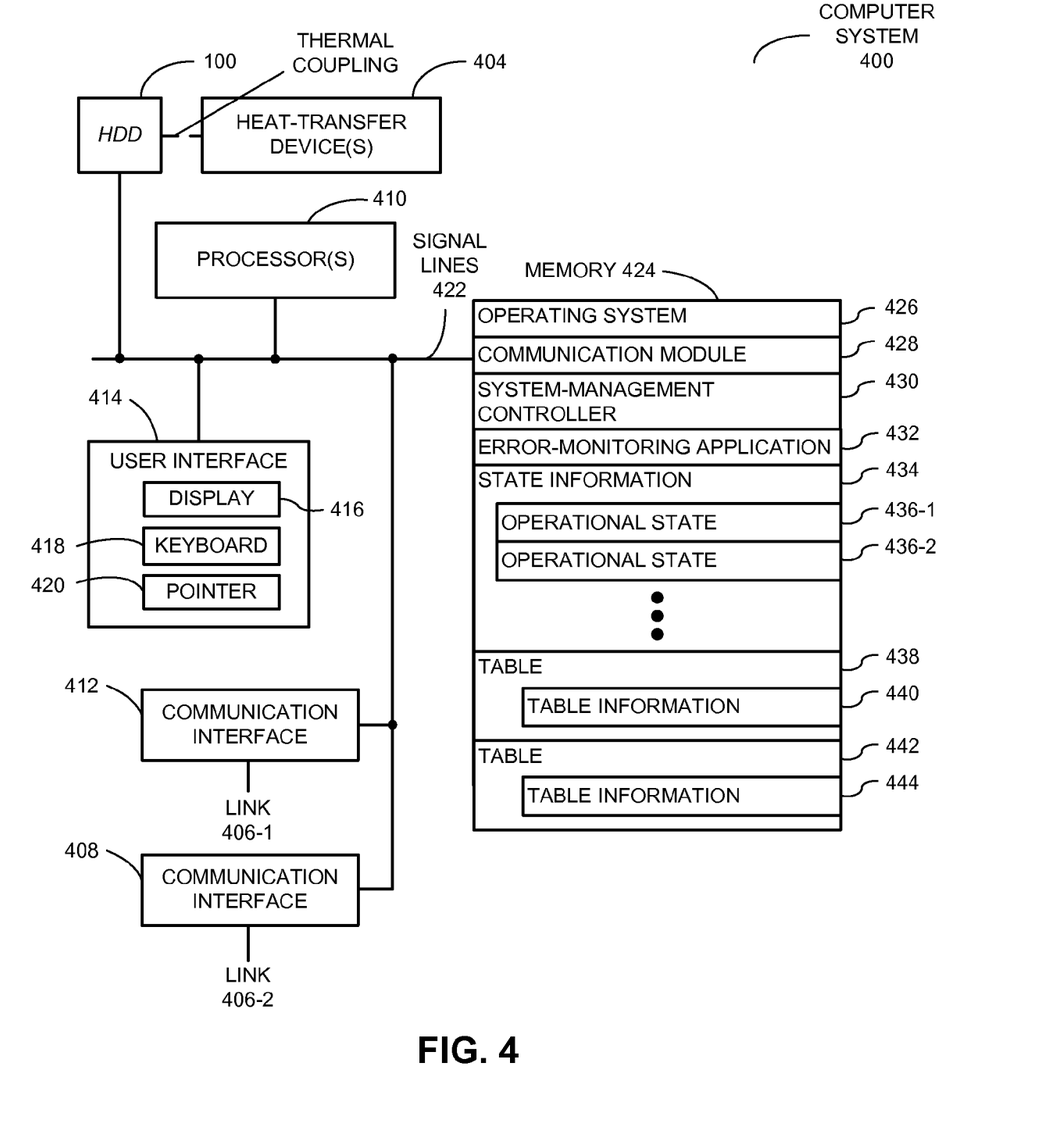
FIG. 4 is a block diagram of a computer system that includes the HDD of FIG. 1 in accordance with an embodiment of the present disclosure.

Although the computer system 400 is illustrated as having a number of discrete components, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. For example, computer system 400 may include a cloud computing system or a client-server computing system.

Furthermore, in some embodiments HDD 100 (FIG. 1), tables 210 and 214 (FIG. 2) and/or computer system 400 include fewer or additional components. For example, HDD 100 (FIG. 1) may include additional sensors other than temperature sensor 116 and/or other types of memory than optional semiconductor memory 120 (which may store the table information associated with the first table or the second table). Moreover, two or more components may be combined into a single component and/or a position of one or more components may be changed. Note that in some embodiments the functionality of the computer system 400 may be implemented more in hardware and less in software, or less in hardware and more in software, as is known in the art. In some embodiments, some or all of the functionality of the computer system 400 is implemented in one or more application-specific integrated circuits (ASICs) and/or one or more digital signal processors (DSPs).

While HDD 100 (FIG. 1) is illustrated in computer system 400, embodiments of this HDD may be included in a wide variety of electronic devices and systems, including: a server, a laptop computer, a personal computer, a work station, a mainframe computer, a digital signal processor, a portable-computing device, a portable electronic device, a personal organizer, a cellular telephone, a personal digital assistant, a game console, an MP3 player, a device controller, and/or a computational engine within an appliance.

Figure 5:
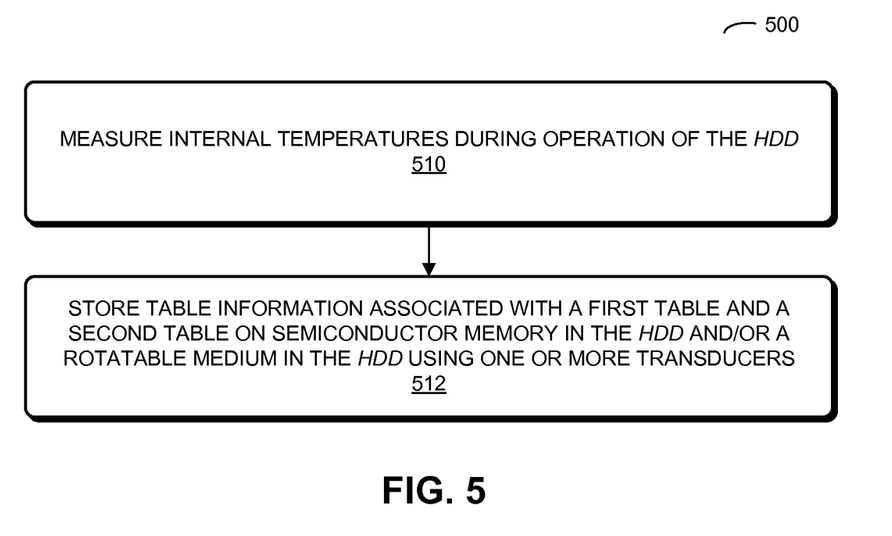
FIG. 5 is a flow diagram of a method for operating the HDD of FIG. 1 in accordance with an embodiment of the present disclosure.

We now describe embodiment of the method. FIG. 5 presents a flow diagram of a method 500 for operating an HDD, such as HDD 100 (FIG. 1). During operation of the HDD, the HDD measures internal temperatures in the HDD (operation 510). Then, the HDD stores the table information associated with the first table and the second table on the semiconductor memory and/or on the rotatable medium using the one or more transducers (operation 512).

In some embodiments, there may be additional or fewer operations. Moreover, the order of the operations may be changed and/or two or more operations may be combined into a single operation.

While the preceding discussion used an HDD as an illustrative example, in other embodiments the table information associated with the first table and the second table may be stored in a wide variety of devices and components, such as: a processor, a removable media drive, a fan module, a battery, a semiconductor device, a memory, a semiconductor memory (for example, flash memory, RAM, ROM, EPROM, EEPROM, etc.), an optical storage device (for example, a holographic storage device, a CD-ROM, a digital versatile disc or digital video disc, an electro-optic storage device, etc.), and/or another electronic component that generates heat during its operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A semiconductor memory, comprising:
    the semiconductor memory; and
    a control logic configured to store table information in a first table and a second table in the semiconductor memory, the table information in the first table including internal temperatures measured during operation of the semiconductor memory, and the table information in the second table including state information specifying operational states of the semiconductor memory;
    wherein each operational state comprises one or more bits indicating an operating range from among a predetermined set of operating ranges and one or more bits indicating a temperature offset within the operating range; and
    wherein a given operational state in the second table is associated with a corresponding internal temperature in the first table.

2. The semiconductor memory of claim 1, further comprising a many-to-one relationship between the internal temperatures and the operational states.

3. The semiconductor memory of claim 1, further comprising a same number of entries in the first table and the second table.

4. The semiconductor memory of claim 1, further comprising:
    a first link; and
    a first interface circuit coupled to the first link and configured to receive write data from and provide read data to the external device via the first 5. The semiconductor memory of claim 4, further comprising:
    a second link; and
    a second interface circuit coupled to the second link and configured to provide the operational states to the external device via the second link.

6. The semiconductor memory of clan 5, wherein the first link is distinct from the second link.

7. The semiconductor memory of clam 1, wherein the operational states comprise one or more of:
    a normal operating state;
    a degraded operating state in which functionality and reliability of the semiconductor memory are compromised;

a severely degraded state in which data integrity within the semiconductor memory is compromised; and a thermal emergency state in which the semiconductor memory is at risk of failure.

8. The semiconductor memory of claim 1, wherein the semiconductor memory comprises at least one of flash memory, RAM, ROM, EPROM, o EEPROM.

9. A computer system, comprising:
a processor;
a semiconductor memory coupled to the processor; and
a control logic configured to store table information in a first table and a second table in the semiconductor memory, the table information in the first table including internal temperatures measured during operation of the semiconductor memory, and the table information in the second table including state information specifying operational states of the semiconductor memory;
wherein each operational state comprises one or more bits indicating an operating range from among a predetermined set of operating ranges and one or more bits indicating a temperature offset within the operating range; and
wherein a given operational state in the second table is associated with a corresponding internal temperature in the first table; and
the second table comprises a bit to identify a boundary of a data frame to enable the transmission of the data frame at different rates from a plurality of memory devices.

10. The computer system of claim 9, further comprising a many-to-one relationship between the internal temperatures and the operational states.

11. The computer system of claim 10, further comprising a same number of entries in the first table and the second table.

12. The computer system of claim 9, further comprising:
a first link, and
a first interface circuit coupled to the first link and configured to receive write data from and provide read data to an external device via the first link.

13. The computer system of claim 12, further comprising:
a second link; and
a second interface circuit coupled to the second link and configured to provide the operational states to the external device via the second link.

14. The computer system of claim 13, wherein the first link is distinct from the second link.

15. The computer system of claim 9, wherein the operational states comprise one or more of:
a normal operating state;
a degraded operating state in which functionality and reliability of the semiconductor memory are compromised;
a severely degraded state in which data integrity within the semiconductor memory is compromised; and
a thermal emergency state in which the semiconductor memory is at risk of failure.

16. The computer system of claim 9, wherein the semiconductor memory comprises at least one of one of flash memory, RAM, ROM, EPROM, or EEPROM.

17. A method for storing information in a semiconductor memory, comprising:
during operation of the semiconductor memory, storing table information in a first table and a second table in the semiconductor memory, wherein storing the table information in the first table comprises storing internal temperatures measured during the operation of the semiconductor memory, and wherein storing the table information in the second table comprises storing state information specifying operational states of the semiconductor memory;
wherein the state information specifying each operational state of the semiconductor memory in the second table comprises one or more bits indicating an operating range from among a predetermined set of operating ranges and one or more bits indicating a temperature offset within the operating range;
wherein a given operational state in the second table is associated with a corresponding internal temperature in the first table; and
the second table includes a bit to identify the boundary of a data frame to enable the transmission of the data frame at different rates from a plurality of memory devices.

18. The method of claim 17, further comprising a many-to-one relationship between the internal temperatures and the operational states.

19. The method of claim 17, further comprising a same number of entries in the first table and the second table.

20. The method of claim 17, further comprising:
receiving write data from and providing read data to an external device via a first link; and
providing the operational states to the external device via a second link, wherein the first link is distinct from the second link.

21. The method of claim 17, wherein the operational states comprise one or more of;
a normal operating state;
a degraded operating state in which functionality and reliability of the semiconductor memory are compromised;
a severely degraded state in which data integrity within the semiconductor memory is compromised; and
a thermal emergency state in which the semiconductor memory is at risk of failure.

22. The method of claim 17, wherein the semiconductor memory comprises at least one of flash memory, RAM, ROM, EPROM, or EEPROM.

23. A semiconductor memory, comprising:
the semiconductor memory; and
a control logic configured to store information in the semiconductor memory, the information including a first portion comprising internal temperatures measured during operation of the semiconductor memory, and the information including a second portion comprising state information specifying operational states of the semiconductor memory;
wherein each operational state comprises one or more bits indicating an operating range from among a predetermined set of operating ranges and one or more bits indicating a temperature offset within the operating range; and
wherein a given operational state in the second portion is associated with a corresponding internal temperature in the first portion; and
the second portion includes a bit indicating the boundary of a data frame to enable the transmission of the data frame at different rates from a plurality of memory devices.

24. The semiconductor memory of claim 23, further comprising a many-to-one relationship between the internal temperatures and the operational states.

25. The semiconductor memory of claim 23, further comprising a same number of entries in the first portion and the second portion.

26. The semiconductor memory of claim 23, further comprising:
a first link; and a first interface circuit coupled to the first link and configured to receive write data from and provide read data to the external device via the first link.

27. The semiconductor memory of claim 26, further comprising:
a second link; and
a second interface circuit coupled to the second link and configured to provide the operational states to the external device via the second link.

28. The semiconductor memory of claim 27, wherein the first link is distinct from the second link.

29. The semiconductor memory of claim 23, wherein the operational states comprise one or more of:
a normal operating state;
a degraded operating state in which functionality and reliability of the semiconductor-memory are compromised;
a severely degraded state in which data integrity within the semiconductor memory is compromised; and
a thermal emergency state in which the semiconductor memory is at risk of failure.

30. The semiconductor memory of claim 23, wherein the semiconductor memory comprises at least one of flash memory, RAM, ROM, EPROM, or EEPROM.

31. A semiconductor memory, comprising:
the semiconductor memory; and
a control logic configured to store table information in a first table and a second table in the semiconductor memory, the table information in the first table including internal temperatures measured during operation of the semiconductor memory, and the table information in the second table including state information specifying operational states of the semiconductor memory;
wherein each operational state comprises one or more bits indicating an operating range from among a predetermined set of operating ranges and one or more bits indicating a temperature offset within the operating range; and
wherein a given operational state in the second table is associated with a corresponding internal temperature in the first table; and
the second table comprises a bit to identify a boundary of a data frame to enable the transmission of the data frame at different rates from a plurality of memory devices.

* * * * *